(12) United States Patent
Kusters et al.

(10) Patent No.: US 6,378,380 B1
(45) Date of Patent: Apr. 30, 2002

(54) MULTIPHASE VENTURI FLOW METERING METHOD

(75) Inventors: Roel Marie Kusters; Antony Aloysius Hubertus Vandeweijer, both of Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/606,388

(22) Filed: Jun. 29, 2000

(30) Foreign Application Priority Data

Jul. 2, 1999 (EP) ............................................ 99202159

(51) Int. Cl.$^7$ .................................................. G01F 1/44
(52) U.S. Cl. ................................................. 73/861.63
(58) Field of Search ......................... 73/861.63, 861.04, 73/861.64

(56) References Cited

U.S. PATENT DOCUMENTS

| 3,909,603 A | 9/1975 | Nicolas | 235/151.34 |
| 4,856,344 A | 8/1989 | Hunt | 73/861.04 |
| 5,361,206 A | 11/1994 | Tabeling et al. | 364/422 |

FOREIGN PATENT DOCUMENTS

| EP | 684458 | 11/1995 |
| GB | 2261519 | 5/1993 |
| WO | 93/22628 | 11/1993 |

OTHER PUBLICATIONS

Bendiksen, Kjell H. "An Experimental Investigation of the Motion of Long Bubbles in Inclined Tubes." *Int. J. Multiphase Flow*, vol. 10, No. 4, pp. 467–483, 1984.

Boyer, C. and H. Lemonnier "Design of a Flow Metering Process for Two–Phase Dispersed Flows." *Int. J. Multiphase Flow*, vol. 22, No. 4, pp. 713–732, 1996.

Nicolas, Y. and E.J. Witterholt "Measurements of Multiphase Fluid Flow" Society of Petroleum Engineers of AIME paper No. SPE 4023, 1972.

*Primary Examiner*—Benjamin R. Fuller
*Assistant Examiner*—Corey D. Mack

(57) ABSTRACT

A method is provided for measuring fluid flow characteristics in a multiphase fluid stream which passes through a venturi flow meter. The liquid holdup ($\alpha_{1,I}$) is measured at or near the inlet of the venturi and a slip factor (S) is determined. The slip factor expresses the difference between the gas and liquid velocity at a selected location in the venturi and is based on the measured level of liquid holdup. The fluid flow characteristics are calculated on the basis of an algorithm which takes into account the measured liquid holdup ($\alpha_{1,I}$) at the inlet of the venturi and different slip factors at the inlet ($S_i$) and in the throat of the venturi ($S_t$).

3 Claims, 5 Drawing Sheets

Fig.5.
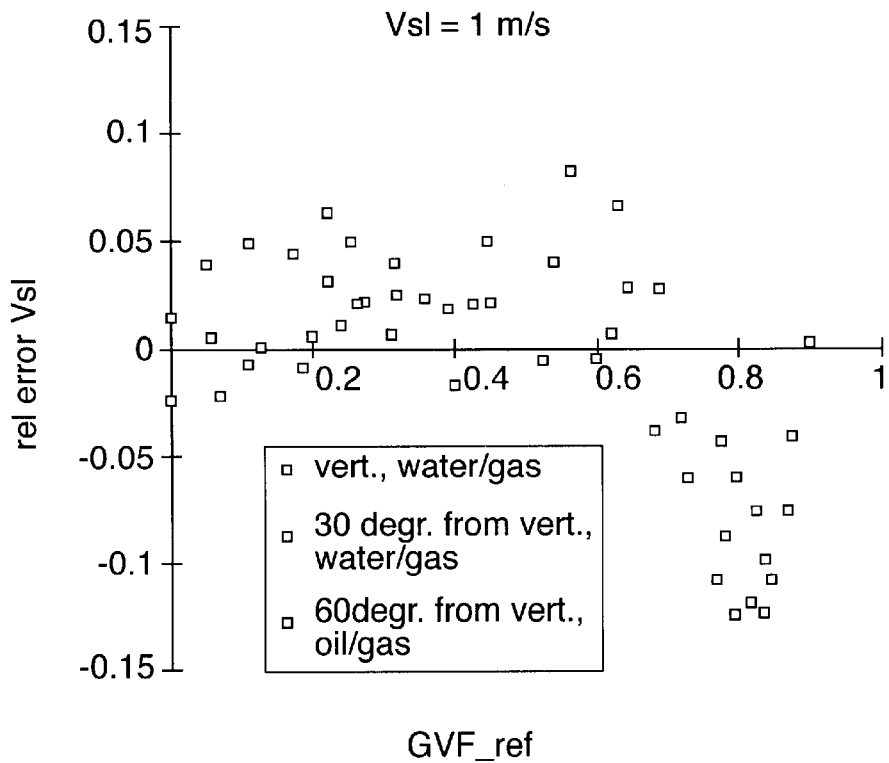
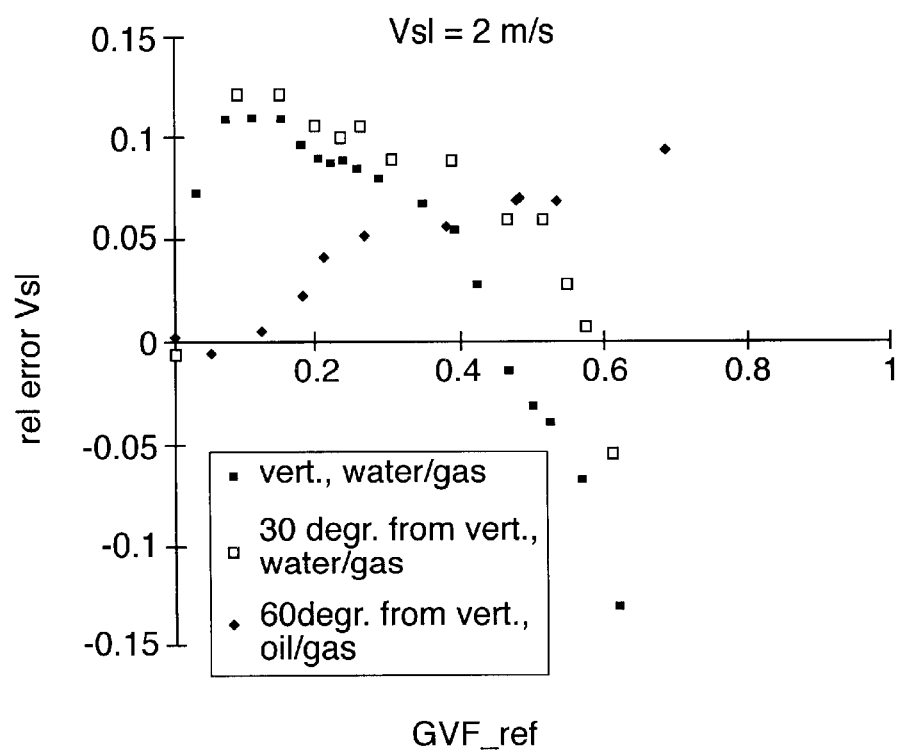

Fig.6.
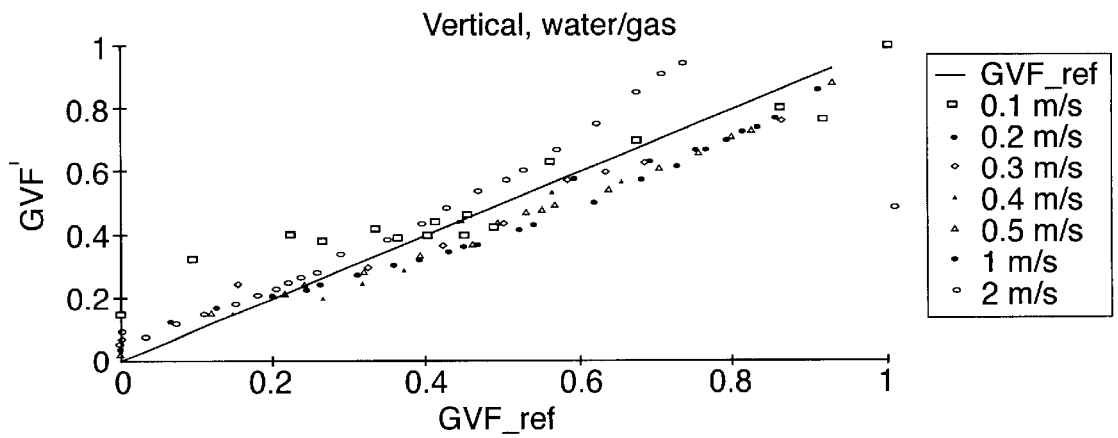
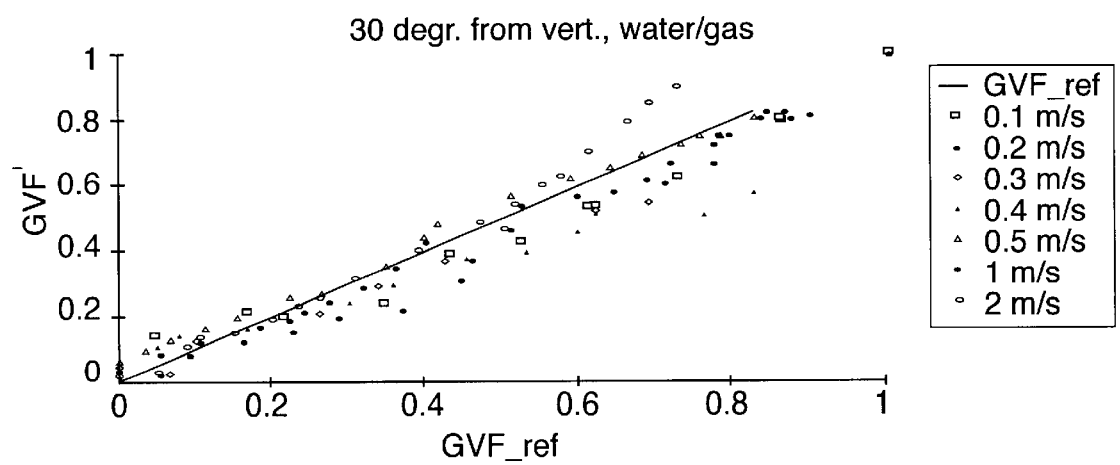
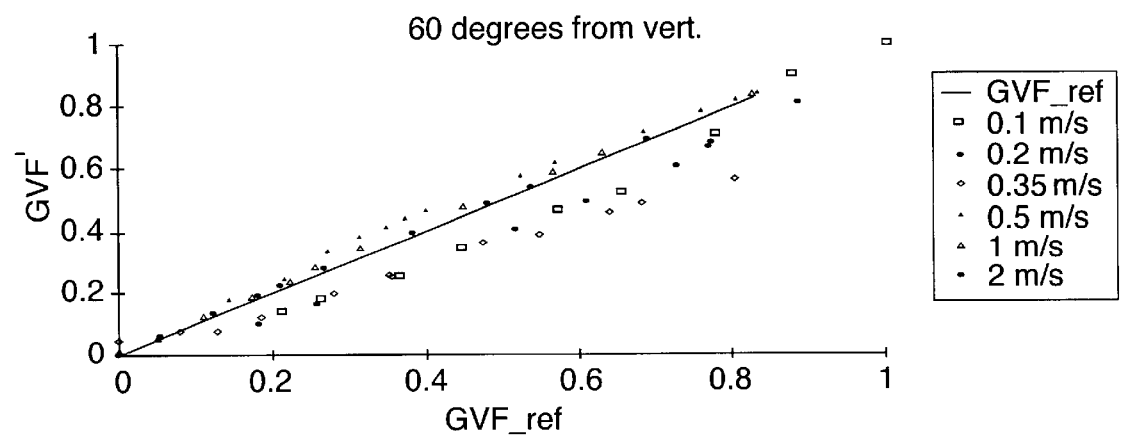

MULTIPHASE VENTURI FLOW METERING METHOD

FIELD OF THE INVENTION

The invention relates to a multiphase venturi flow metering method. More particularly, the invention relates to a method for measuring fluid flow characteristics in a multiphase fluid stream containing liquid and gaseous phases which passes through a gradiometer-venturi flow meter.

BACKGROUND OF THE INVENTION

Venturi flow meters are widely used to measure the flow rate in a flowline. UK patent application GB 2261519 and International patent application PCT/GB93/00885 disclose venturi flow meters for monitoring the rate of flow of a water and oil containing production stream in an oil production well.

European patent application 0684458 discloses the use of a pair of axially separated venturi flow meters for measuring flow rate of oilwell effluents containing hydrocarbons, gas and water.

In this and the other known devices the density of the fluid mixture is measured by measuring the pressure difference in a vertical or inclined gradiometer section of the well where there is no significant flow restriction and the venturi flow meter(s) is or are placed in an adjacent section. Since the pressure difference in the venturi flow meter is proportional to $\rho v^2$ and the mixture density $\rho$ is known the fluid velocity and volume flow rate can be calculated. The aforementioned European patent application 0684458 specifies that the twin venturi flow meter arrangement may be equipped with fluid homogenisation means and that if the densities of the aqueous, oily and gaseous components are known also the fluid composition can be determined by periodic variation of the fluid velocity through the twin venturi flow meter arrangement and by cross-correlating the pressure drops measured across the venturis.

Other multiphase flow monitoring systems which address the problem of slip between the fluid phases but which do not employ a venturi are known from U.S. Pat. Nos. 3,909,603 and 5,361,206.

The article "Design of a flow metering process for a two-phase dispersed flow" published by C. Boyer and H. Lemonnier in the International Journal Multiphase Flow Vol. 22, No. 4, pp. 713–732, 1996 (Elsevier Science Ltd.) discloses that in a two-phase venturi flow meter a velocity slip may occur between the gaseous and liquid phases at the throat of the venturi.

A conclusion derived in the article is that it is possible to determine a critical bubble or droplet diameter beyond which the homogeneous flow model is no longer valid.

The method according to the preamble of claim 1 is known from U.S. Pat. No. 4,856,344. In the known method it is assumed that the slip between the liquid and gas phase in a bubble flow regime remains constant over the length of the venturi and a fluid homogeniser is used since the measurement would be misleading if the fluid mixture would not be reasonably homogeneous.

The present invention aims to provide a multiphase venturi flow metering method which is able to operate accurately not only when a substantially homogeneous multiphase flow passes through the venturi but also when a substantially inhomogeneous multiphase flow, such as a slug flow, passes through the venturi.

SUMMARY OF THE INVENTION

The method according to the invention comprises:

measuring liquid holdup ($\alpha_{1,I}$) at or near the inlet of the venturi;

determining a slip factor (S) which expresses the difference between the gas and liquid velocity at a selected location in the venturi, which slip factor is based on the measured level of liquid holdup; and calculating the fluid flow characteristics on the basis of an algorithm which takes into account the measured liquid holdup ($\alpha_{1,I}$) at the inlet of the venturi and different slip factors at the inlet ($S_i$) and in the throat of the venturi ($S_t$).

Preferably, if the liquid holdup at the inlet of the venturi $\alpha_{1,I}$ exceeds a pre-determined value slipfactors at the inlet of the venturi ($S_i$) and in the throat of the venturi ($S_t$) are determined from empirical correlations, which slipfactors are used as input in a first algorithm, together with the pressure drop between the inlet and throat of the venturi, to calculate the superficial liquid velocity, whereas if the liquid holdup at the inlet of the venturi remains below the predetermined value then the slip factors $S_i$ and $S_t$ are determined using empirical correlations given in a second algorithm.

BRIEF DESCRIPTION OF THE DRAWINGS

FIG. 5 shows the result of test loop experiments to determine the relative liquid error as a function of the reference gas volume fraction GVF-ref for $V_{sl-ref}$=1 m/s and 2 m/s.

FIG. 6 shows the result of experiments to determine the gas volume fraction GVF' given by the multiphase flow model according to the invention as a function of the reference gas volume fraction GVF-ref for liquid rates ranging from 0.1 to 2 m/s and three different inclinations of the test loop.

DETAILED DESCRIPTION

The invention will be described in more detail with reference to the accompanying drawings.

Figure 1:
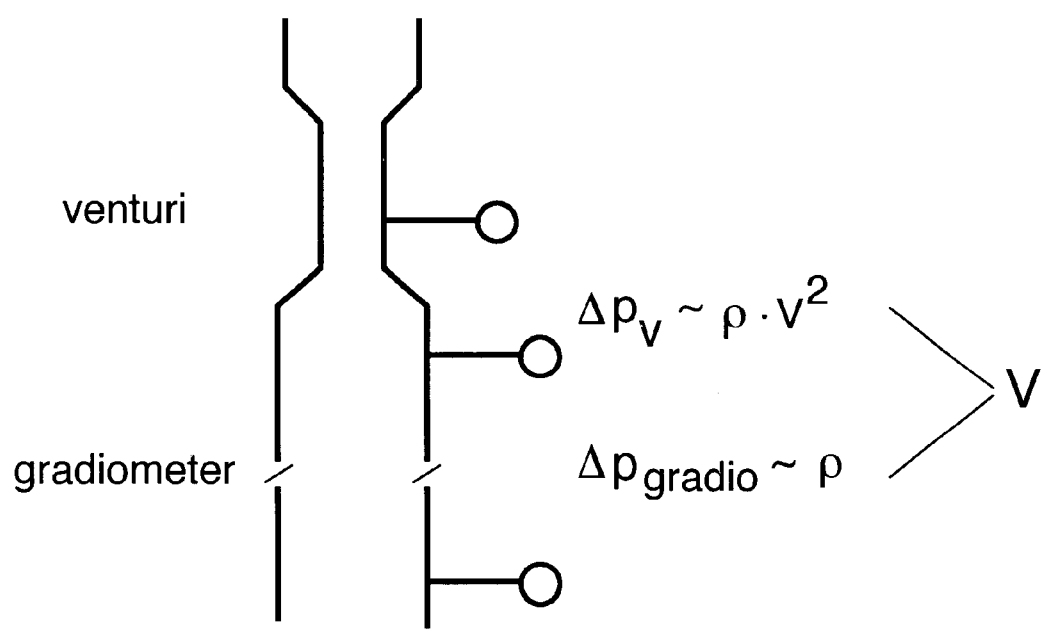
FIG. 1 shows schematically the general operation of a single phase venturi flow meter.
Figure 2:
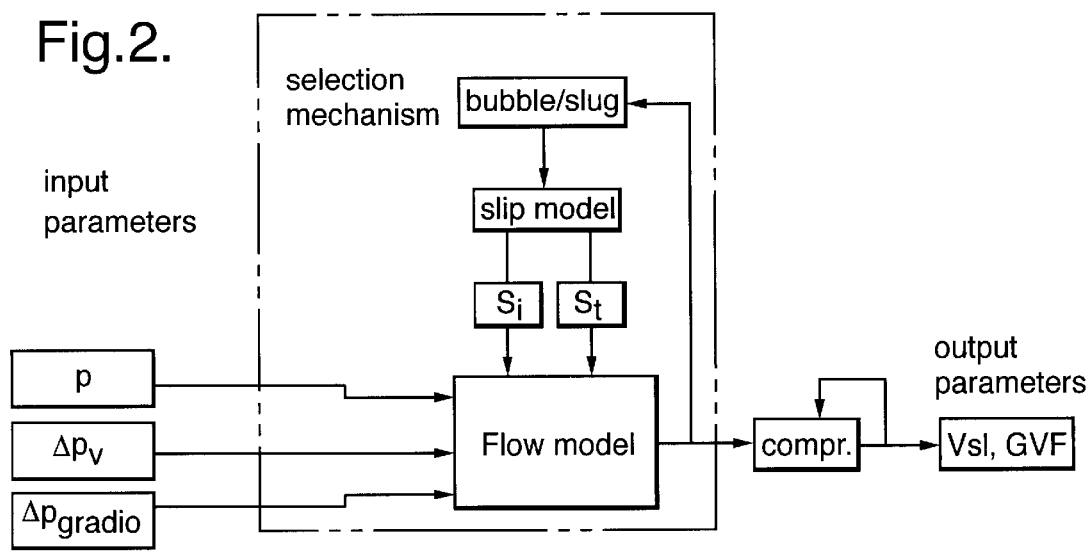
FIG. 2 shows a schematic overview of the method according to the invention and the interaction between the flow model, the slip models and the flow pattern selection mechanisms.

The configuration of a conventional single phase gradiometer-venturi based flow meter is shown schematically in FIG. 1. FIG. 1 shows that a gradiometer consists of a straight pipe over which a pressure difference $\Delta p_{gradio}$ is measured. Over the venturi also a pressure drop $\Delta p_v$ is measured, between the inlet and the throat of the venturi.

The operation principle of this flow meter is as follows. From the pressure drop $\Delta p_v$ the product of the density $\rho$ and the square of the velocity V can be obtained by applying the laws of Bernoulli and of mass conservation. The liquid density can be obtained from the hydrostatic column that is given by $\Delta p_{gradio}$, corrected for the friction losses. Combined, these two results give the velocity, v, of the liquid.

In the development of the multiphase flow metering method according to the invention with a venturi-gradio based flow meter the following assumptions have been made:
a) The gas/liquid flow is assumed to be one phase with one (variable) density $\rho_m$ and one velocity $V_m$.
b) The gas/liquid mixture is accelerated in the converging part of the venturi. As a consequence it experiences an extra buoyancy force which accelerates the gas phase relative to the liquid phase (and consequently changes the slip). In this investigation this extra buoyancy force is assumed to be constant in the converging part of the venturi.

The gas/liquid flow in the throat of the venturi is not accelerated and therefore it experiences no extra buoyancy force. As a consequence the gas phase is slowed down relative to the liquid phase. It is assumed that this can be neglected: i.e. the slip in the throat of the venturi is assumed to be equal to that at the entrance point of the throat.
c) The gas/liquid flow is considered to be incompressible. Hereby the gas and liquid densities are assumed to be known. The influence of the compressibility effect is accounted for after the flow model is applied.

Based on these assumptions the superficial liquid velocity is derived as follows. First the mixture velocity $V_m$ and liquid volume fraction LVF are determined. Multiplying these two quantities then gives the superficial liquid velocity $V_{sl}$.

The mixture velocity $V_m$ is obtained from the pressure drops $\Delta p_v$ and $\Delta p_{gradio}$ in the same way as is done for the liquid velocity in the liquid-only flow meter concept. The only difference is that the density $\rho_m$ of the mixture can vary because of the varying slip effect in the venturi.

The liquid volume fraction LVF is determined from the local liquid fraction, also called liquid holdup, and the slip effect. The liquid holdup can be determined from the pressure drop $\Delta p_{gradio}$ over the gradiometer.

The gas volume fraction GVF is determined directly from the liquid volume fraction.

As stated above two flow patterns have been investigated: bubble flow (BF) and slug flow (SF). This is because these flow patterns mainly occur at the conditions in which the meter has to operate: upward pipe flow in which 0.1 m/s<$V_{sl}$<3 m/s and GVF<70%.

Bubble flow (BF) is defined as a continuous liquid flow in which small gas bubbles are dispersed. In a known slip model for bubble flow the velocity of the dispersed gas bubbles relative to the liquid, or slip velocity, is obtained from a force balance between the buoyancy force and the drag force exerted by the liquid on the bubble.

Slug flow (SF) is defined as an alternating flow of large gas bubbles whose diameter is approximately that of the pipe and liquid slugs in which small gas bubbles are dispersed. In slug flow quantification of the slip effect is very difficult because back flow occurs. As an approximation slug flow is assumed to be an elongated bubble (EB) flow, which is a special form of slug flow. In elongated bubble flow the EB slip model can be applied. In this model it is assumed that the slip velocity of the elongated gas bubbles is proportional to the square root of the gravitational acceleration and the pipe diameter.

The selection mechanism which predicts which flow pattern occurs, is based on the following criterion:

When the local gas volume fraction in the pipe, also called gas holdup, exceeds a certain value, bubble flow transforms into slug flow. This critical gas holdup has been found to be 35% for the vertical case. The GVF that corresponds to this critical gas holdup is 50% because of the slip effect. For the inclined cases this value decreases because for these cases separation of the phases occurs at lower GVF caused by gravity (the gas phase moves to the top of the tubing while the liquid phase remains at the bottom side of the tubing). The values for the critical GVF, used in this investigation, are given by:

$$\text{critical GVF}_{bubble/slug} = \cos\alpha \cdot k \quad (2.1)$$

where 40%<k<60% and k is empirically determined, with $\alpha$ as the angle of inclination from vertical.

The mixture has been assumed incompressible in the flow developed model. This is a reasonable assumption for downhole conditions where the absolute pressure is large and the relative pressure changes are low causing only low relative changes in the density, which is a measure for the influence of the compressibility on the liquid rate. However, at flow loop conditions the absolute pressure is low and consequently the relative pressure changes are large causing large relative changes in the density. Therefore, the influence of the compressibility on the liquid rate can not be neglected at flow loop conditions. In this investigation a correction for the influence of the compressibility on the liquid rate has to be applied because the flow model is tested at flow loop conditions.

The influence of compressibility of the gas/liquid mixture on the liquid rate, determined from the above-described flow model, can be understood qualitatively as follows. When the gas-liquid mixture flows through the converging part of the venturi it is accelerated causing the pressure in the venturi to drop. As a consequence the mixture will expand causing a larger acceleration of the mixture and consequently a larger value for the pressure drop. This larger pressure drop leads to the prediction of a higher liquid rate.

In this investigation the liquid rate is corrected for the influence of the compressibility by multiplying the pressure drop over the venturi with the factor $(1-M^2)$ with M as the Mach number which is defined as the quotient of the mixture velocity and the speed of sound. Hereby it is assumed that the correction that is valid for low GVF can also be applied at higher GVF.

Hereinbelow definitions of quantities will be given that mainly occur in gas/liquid upward flow.

The superficial liquid velocity $V_{sl}$ in a gas/liquid pipe flow is defined as the velocity of the liquid in case only the liquid would flow through the pipe at the same liquid volume rate. A similar definition holds for the superficial gas velocity $V_{sg}$. The definitions for $V_{sl}$ and $V_{sg}$ can be written in formula form:

$$V_{sl} = \frac{Q_l}{A}, \quad V_{sg} = \frac{Q_g}{A} \quad (A.1)$$

with $Q_l$ and $Q_g$ as the liquid and gas volume rate and A as the cross-sectional area of the tubing.

The gas volume fraction GVF is defined as the quotient of the gas volume rate and the volume rate of the mixture. For the liquid volume fraction LVF a similar definition holds. In terms of the superficial velocities these definitions can be written as follows:

$$GVF = 1 - LVF = \frac{V_{sg}}{V_{sg} + V_{sl}} \quad (A.2)$$

The actual liquid velocity Val is the local velocity of the liquid in the gas/liquid flow. A similar definition holds for the actual gas velocity $V_{ag}$. $V_{al}$ and $V_{ag}$ are related to $V_{sl}$ and $V_{sg}$ in the following way:

$$V_{al} = \frac{V_{sl}}{\alpha_l}, \quad V_{ag} = \frac{V_{sg}}{\alpha_g} \tag{A.3}$$

with $\alpha_l$ and $\alpha_g$ as the local fraction of the liquid and gas in the tubing, or liquid and gas holdup.

The holdup and the volume fraction of a phase do not have to be equal. This is caused by the slip effect. The slip effect is the mechanism that the gas phase moves faster upward than the liquid phase caused by the buoyancy force. The slip effect is described by a slip factor S which is defined as:

$$S = \frac{V_{al}}{V_{ag}} \tag{A.4}$$

It must be noted that the slip factor changes in the venturi because of an increase in the local velocities and because of an extra buoyancy force.

Hereinbelow the flow model will be described which plays a central role in the determination of the superficial liquid velocity and the gas volume fraction. It must be noted that these quantities are determined for the conditions at the inlet of the venturi or inlet conditions. The superficial liquid velocity is therefore written as $V_{sl,i}$ with the subscript i referring to inlet conditions.

Below first an expression for the gas volume fraction GVF will be derived. After that the derivation for the superficial liquid velocity $V_{sl,i}$ at inlet conditions will be discussed.

In the flow model an expression for the gas volume fraction in the pipe is obtained by substituting the definitions (A.1), (A.2), (A.3) and (A.4) at inlet conditions into each other. The following expression is then obtained:

$$GVF = 1 - LVF = \frac{\alpha_{g,i}}{1 + \alpha_{1,i}(S_i - 1)} \tag{B.1}$$

with $\alpha_{l,i}$ and $\alpha_{g,i}$ as the liquid and gas holdups at inlet conditions and $S_i$ as the slip factor at inlet conditions.

The holdups at the inlet of the venturi can be determined from the hydrostatic head that is given by the pressure difference $\Delta p_{gradio}$ over the gradiometer. The following relation for the liquid holdup at inlet conditions then results:

$$\alpha_{1,i} = 1 - \alpha_{g,i} = \frac{\Delta p_{gradio} - \alpha_{g,i}\rho_g g L_{gradio}\cos\alpha - 0.5\alpha - 0.5\alpha_{1,i}f_{tp}\rho_1 v_{m,i}^2 \frac{L_{gradio}}{D}}{\rho_1 g L_{gradio}\cos\alpha} \tag{B.2}$$

with $\rho_g$ and $\rho_l$ as the gas and liquid density, g as the gravitational acceleration, $L_{gradio}$ as the length of the gradiometer, $\alpha$ as the inclination angle from vertical, $f_{tp}$ as a two-phase friction factor, $V_{m,i}$ as the mixture velocity at inlet conditions and D as the diameter of the pipe.

Equation (B.2) shows that in order to determine the holdups at inlet conditions the pressure drop $\Delta p_{gradio}$ has to be corrected for the hydrostatic column due to the gas phase (second term on the right hand side) and for the friction (third term on the right hand side). In order to arrive at an explicit relation for the holdups equation (B.2) can be rewritten as follows:

$$\alpha_{1,i} = \frac{\Delta p_{gradio} - \rho_g g L_{gradio}\cos\alpha}{(\rho_1 - \rho_g)g L_{gradio}\cos\alpha + 0.5 f_{tp}\rho_1 v_{m,i}^2 \frac{L_{gradio}}{D}} \tag{B.3}$$

Equation (B.3) shows that for calculation of the holdups the mixture velocity $V_{m,i}$ is needed. However for the determination of $V_{m,i}$ the holdups in their turn are needed, as will be seen in the second part of this appendix. In other words an iteration process is needed. This iteration is started by calculating the holdups and the GVF without accounting for friction. For a schematic overview of all the iterations that are needed in the flow model the reader is referred to the detailed flow chart in Appendix E.

The friction factor $f_{tp}$ is given by the following equation:

$$f_{tp} = \left(0.0072 + 0.636\left(\frac{\mu_1}{\rho_1 V_{m,i} D}\right)^{0.355}\right)(1 + GVF)^2 \tag{B.4}$$

with $\mu_l$ as the viscosity of the liquid phase. Equation (B.4) shows that for calculating the friction factor the mixture velocity $V_{m,i}$ and GVF are needed. Also in this case iteration is needed because the friction factor in its turn is needed for calculation of $V_{m,i}$ and GVF. However, this iteration is avoided by using $V_{m,i}$ and GVF values for determination of $f_{tp}$ which are not accounted for the friction.

An expression for the superficial liquid velocity $V_{sl,i}$ at the inlet of the venturi is obtained by first calculating the mixture velocity $V_{m,i}$ at inlet conditions. Multiplying this mixture velocity with the liquid volume fraction LVF then gives the superficial liquid velocity $V_{sl,i}$. The derivation of the relation for $V_{m,i}$ will now be given.

Based on the assumption that the gas/liquid mixture can be considered as one phase integration of the Bernoulli-equation over the converging part of the venturi gives the following result:

$$\Delta p_v' = \Delta p_v - \alpha_{1,i}\rho_1 g L_v \cos\alpha - 0.5\alpha_{1,i} f_{tp} \rho_1 V_{m,i}^2 \frac{L_v}{D}\left[\frac{1-\beta^4}{4\beta^4(1-\beta)}\right] = \tag{B.5}$$

$$\Delta\left(\frac{1}{2}\rho_m V_m^2\right)\bigg|_{inlet}^{throat}$$

with $\Delta p_v'$ as the pressure drop over the venturi that is corrected for the hydrostatic head and the friction in the venturi. $L_v$ is the length from the inlet to the throat of the venturi, $\beta$ the quotient of the diameters in the throat and at the inlet of the venturi, $\rho_m$ the local mixture density and $V_m$ the local mixture velocity.

Equation (B.5) shows that the hydrostatic column (second term), integrated over the converging part of the venturi, is approximated by a hydrostatic column with a constant liquid holdup that is assumed to be equal to that at the inlet of the venturi.

The friction term in equation (B.5) (third term) has already been integrated over the converging part of the venturi. The factor between brackets is a geometrical correction factor that accounts for the narrowing of the pipe in the venturi and for the resulting acceleration of the mixture. Further the friction factor $f_{tp}$ in the converging part of the venturi is assumed to be equal to that at the inlet of the venturi.

The mixture densities in the throat and at the inlet of the venturi, that appear in equation (B.5), can be expressed in terms of the holdups as follows:

$$\rho_{m,i} = \alpha_{l,i}\rho_l + \alpha_{g,i}\rho_g$$

$$\rho_{m,i} = \alpha_{L,i}\rho_l + \alpha_{g,i}\rho_g \qquad (B.6)$$

with the subscripts i and t for inlet and throat conditions.

With the help of the equations (B.5) and (B.6) the mixture velocity $V_{m,i}$ at the inlet of the venturi can be expressed in terms of $\Delta p_v'$ and the holdups in the throat and at the inlet of the venturi:

$$V_{m,i} = \sqrt{\frac{2\Delta p_v'}{\frac{A_i^2}{A_t^2}(\alpha_{1,t}\rho_1 + \alpha_{g,t}\rho_g) - (\alpha_{1,i}\rho_1 + \alpha_{g,i}\rho_g)}} \qquad (B.7)$$

with $A_i$ and $A_t$ as the cross-sectional areas at the inlet and in the throat of the venturi. Multiplying this equation with the expression for LVF, that can be obtained from equation (B.1), gives the following relation for the superficial liquid velocity at inlet conditions, $V_{sl,i}$:

$$V_{sl,i} = \frac{\alpha_{1,i} S_i}{1 + \alpha_{1,i}(S_i - 1)} \sqrt{\frac{2\Delta p_v'}{\frac{A_i^2}{A_t^2}(\alpha_{1,t}\rho_1 + \alpha_{g,t}\rho_g) - (\alpha_{1,i}\rho_1 + \alpha_{g,i}\rho_g)}} \qquad (B.8)$$

Equation (B.8) shows that the holdups both at the inlet and in the throat of the venturi have to be known for calculating the superficial liquid velocity at inlet conditions. The holdups at the inlet of the venturi are given by equation (B.3). The holdups in the throat of the venturi can be determined from mass balances for the separate phases over the converging part of the venturi. Assuming that the densities of the separate phases are constant these are given by:

$$\alpha_{g,i} V_{ag,i} A_i = \alpha_{g,t} V_{ag,t} A_t$$
$$\alpha_{l,i} V_{al,i} A_i = \alpha_{l,t} V_{al,t} A_t \qquad (B.9)$$

Substituting these two relations into each other gives:

$$\alpha_{1,t} = 1 - \alpha_{g,t} = \frac{\alpha_{1,i} S_i}{\alpha_{1,i} S_i + \alpha_{g,i} S_t} \qquad (B.10)$$

Inserting the equations (B.3) and (B.10) into (B.8) gives for the superficial velocity at the inlet of the venturi:

$$V_{sl,i} = \frac{S_i}{\frac{1}{\alpha_{1,i}} + (S_i - 1)} \sqrt{\frac{2\Delta p_v'}{\left(\frac{A_i^2}{A_t^2}\right) S_i \rho_1 + \frac{\frac{\alpha_{g,i}}{\alpha_{1,i}} S_t \rho_g}{S_i + \frac{\alpha_{g,i}}{\alpha_{1,i}} S_t} - \alpha_{1,i}\rho_1 - \alpha_{g,i}\rho_g}} \qquad (B.11)$$

with $\alpha_{1,i} = \frac{\Delta p_{gradio} - \rho_g g L_{gradio} \cos\alpha}{(\rho_1 - \rho_g) g L_{gradio} \cos\alpha + 0.5 f_{tp} \rho_1 V_{m,i}^2 \frac{L_{gradio}}{D}}$ Hereinbelow the two slip models will be discussed, namely the NW slip model for bubble flow and the EB slip model for slug flow. Bubble flow is defined as a continuous liquid flow in which small gas bubbles are dispersed. Slug flow is defined as an alternating flow of large gas bubbles whose diameter is approximately that of the pipe and liquid slugs in which small gas bubbles are dispersed.

After discussion of the two slip models the behaviour of the slip-effect in the venturi will be discussed.

A semi-empirical relation is known for the terminal velocity $V_\infty$ for a dispersed bubble in a stagnant liquid column, also called the bubble rise velocity. This relation is based on a force balance between the buoyancy force and the drag force that both act on a single bubble. An important quantity that appears in this balance is the volume of the bubble. This volume is determined from a balance between the interfacial tension, which tries to keep the bubble intact, and the turbulent break-up. The following relation then results:

$$V_\infty = C\left[\frac{g\sigma\Delta\rho}{\rho_1^2}\right]^{1/4} \qquad (C.1)$$

with $\Delta\rho$ as the density difference between the phases, $\rho_l$ as the liquid density, g as the gravitational acceleration and $\sigma$ as the interfacial tension. Experiments show that the constant C is 1.53.

Equation (C.1) gives the bubble rise velocity of a single bubble. To take the effect of coalescence into account Nicolas & Witterholt (NW) have, as described in their SPE (Society of Petroleum Engineers) paper 4023, published in 1972, also taken the holdups of the phases into account in their determination of a relationship for the bubble rise velocity. They have empirically found the following relationship for the velocity $V_{slip}$ of oil bubbles relative to the velocity of the continuous water phase in oil/water bubble flow:

$$V_{slip} = \alpha_w^n V_\infty \qquad (C.2)$$

with $\alpha_w$ as the water holdup and n as a constant that ranges from 0.5 (large bubble limit) to 2 (small bubble limit).

In the NW model it is assumed that the slip velocity for oil/water bubble flow can also be applied for gas/liquid bubble flow. The following relation for the slip factor SNW in gas/liquid bubble flow is then obtained:

$$S_{NW} = \frac{V_{al}}{V_{ag}} = \frac{V_{al}}{V_{al} + \alpha_1^n V_\infty} \qquad (C.3)$$

Because already at small GVF large bubbles can occur it is preferred to set n equal to 0.5.

Slug flow is a very complicated flow pattern in which back flow occurs. Determination of a slip factor is therefore very difficult. As an approximation the whole region of slug flow is considered as an elongated bubble flow which is a special form of slug flow. In this approximation the slip ago factor SEB for elongated bubble flow is applicable for the whole region of slug flow.

Experiments, described in literature, show that the relative velocity of large elongated bubbles in elongated bubble flow is proportional to the square root of the gravitational acceleration and the pipe diameter D: $\sqrt{gD}$. Based on this expression the following relation can be written for the slip factor SEB:

$$S_{EB} = \frac{V_{al}}{V_{ag}} = \frac{V_{al}}{V_{al} + C\sqrt{gD}} \qquad (C.4)$$

with C as a proportionality coefficient which depends on pipe inclination as described by K. H. Bendiksen in the International Journal of Multiphase Flow (1984). C has a value of 0.35 for vertical pipes.

The slip factor in the throat of the venturi is equal to that at the entrance point of the throat, as is one of the assumptions of the flow model. It must be noted that the gas/liquid mixture experiences an extra buoyancy force at this point because it is part of the converging part of the venturi in which the mixture is accelerated. In the calculation of the slip factor in the throat of the venturi therefore an effective gravitational acceleration has to be used that takes the extra buoyancy force into account. As an approximation the following expression can be written for the effective gravitational acceleration g':

$$g' = \frac{\Delta p'_v}{\alpha_{l,i} \rho_1 h_v} + g \tag{C.5}$$

with $\alpha_{l,i}$ as the liquid holdup at the inlet of the venturi and $h_v$ as the height of the converging part of the venturi. In equation (C.5) $\alpha_{l,i}$ has been used (and not $\alpha_{l,t}$ as should be expected) because g' is eventually used for the determination of $\alpha_{l,t}$. In other words equation (C.5) shows one step of iteration.

As stated above the gas-liquid mixture can become very compressible at standard conditions. This can be shown when considering the speed of sound, which is a measure for the compressibility. A low speed of sound indicates a large compressibility of the gas-liquid mixture. The following expression is known for the speed of sound $c_T$ in isothermal gas/liquid flow in which no slip has been assumed:

$$c_T^2 = \frac{p}{\rho_1 \alpha_g \alpha_l} \tag{D.1}$$

with p as the absolute pressure. At 1 bar and a gas holdup of 4 percent it follows from this approximation that the speed of sound of the gas/liquid mixture is about 50 m/s, which is much lower than that of the separate phases (for example $c_{air}$=300 m/s and $c_{water}$=1500 m/s). In other words the gas-liquid mixture is then much more compressible than its separate phases.

As an approximation the effect of compressibility, as described qualitatively in section 2.3, can be accounted for by multiplying the measured pressure drop $\Delta p_v$' over the venturi with the factor $(1-M^2)$ in which M is the Mach number which is defined as follows:

$$M = \frac{V_m}{c} \tag{D.2}$$

Below this correction for the compressibility effect will be explained starting from the case of a dilute bubble flow.

The following momentum equation has been derived for a dilute isothermal bubble flow through a venturi:

$$\frac{dp}{dx} = \rho_1 V_m^2 \frac{1}{(1-M^2)} \frac{1}{A} \frac{dA}{dx} \tag{D.3}$$

with A as the cross-sectional area of the pipe. Integrating this equation over the converging part of the venturi while assuming the Mach number to be constant in the venturi, the following equation is obtained:

$$\left(\Delta p_v \cdot (1-M^2)\right) = \left(\frac{1}{2}\rho_m V_m^2\right)\Big|_{inlet}^{throat} \tag{D.4}$$

This equation agrees with equation (B.1), which is the starting point of the flow model, at dilute bubble flow conditions. The only difference is the factor $(1-M^2)$ which accounts for the effect of compressibility. In other words, for dilute bubble flow the flow model can be corrected for the compressibility effect by multiplying the measured pressure drop with the factor $(1-M^2)$. It is now assumed that also for larger gas volume fractions the flow model can be corrected for the compressibility effect by multiplying the pressure drop $\Delta p_v$ with the factor $(1-M^2)$.

It must be noted that the Mach number increases as the mixture flows through the converging part of the venturi. This has two reasons: firstly because the mixture is accelerated so that the mixture velocity increases and secondly because the acceleration causes the pressure and thus the speed of sound to drop. To account for the increasing Mach number an effective Mach number $M_{eff}$ has been used, which is defined as follows:

$$M_{eff} = \frac{V_{m,i}}{c_t} \cdot \frac{1}{\beta_{eff}^2} \tag{D.5}$$

with $V_{m,i}$ as the mixture velocity at the inlet of the venturi, $c_t$ as the speed of sound at throat conditions. $\beta_{eff}$ is based on the quantity $\beta$ which is the ratio of the diameters in the throat and at the inlet of the venturi. $\beta_{eff}$ is larger than $\beta$ and smaller than 1. In this investigation venturis with two different $\beta$'s have been investigated. The corresponding $\beta_{eff}$'s are:

$\beta=0.5 \rightarrow \beta_{eff}=0.7$ $\beta=0.3 \rightarrow \beta_{eff}=0.4$

Based on the foregoing GVF and $V_{sl,i}$ are calculated as follows:

$$GVF = \frac{(1-\alpha_{l,i})}{1+\alpha_{l,i}(S_i-1)} \tag{E.1}$$

$$V_{sl,i} = \frac{S_i}{\frac{1}{\alpha_{l,i}} + (S_i-1)} \sqrt{\frac{(1-M_{eff}^2)2\Delta p'_v}{\left(\frac{A_i^2}{A_t^2}\right)S_i \rho_1 + \frac{\frac{\alpha_{g,i}}{\alpha_{l,i}} S_t \rho_g}{S_i + \frac{\alpha_{g,i}}{\alpha_{l,i}} S_t} - \alpha_{l,i}\rho_1 - \alpha_{g,i}\rho_g}} \tag{E.2}$$

with $$\Delta p'_v = \Delta p_v - \alpha_{l,i}\rho_1 g L_v \cos\alpha - 0.5 \left[\frac{1-\beta^4}{4(1-\beta)\beta^4}\right]\alpha_{l,i} f_{tp} \rho_1 V_{m,i}^2 \frac{L_v}{D}$$

$$\alpha_{l,i} = \frac{\Delta p_{gradio} - \rho_g g L_{gradio} \cos\alpha}{(\rho_1 - \rho_g)g L_{gradio} \cos\alpha + 0.5 f_{tp} \rho_1 V_{m,i}^2 \frac{L_{gradio}}{D}}$$

$$M_{eff} = \sqrt{\frac{\alpha_{l,i}(1-\alpha_{l,i})\rho_1}{p}} \cdot \frac{V_{m,i}}{\beta_{eff}^2}$$

Bubble flow (BF) occurs if GVF, calculated on the basis of equation E.1, $<\cos\alpha \cdot k$, where 40%<k<60% and k is determined empirically, in that case:

$$S_i = \frac{\frac{V_{sl,i}}{\alpha_{l,i}}}{\frac{V_{sl,i}}{\alpha_{l,i}} + 1.53\alpha_{l,i}^{0.5}\left(\frac{g\sigma}{\rho_1}\right)^{0.25}}, \tag{E.3}$$

-continued $$S_t = \cfrac{\cfrac{1}{\beta^2}\cfrac{V_{sl,i}}{\alpha_{l,i}}}{\cfrac{1}{\beta^2}\cfrac{V_{sl,i}}{\alpha_{l,i}} + 1.53\alpha_{l,i}^{0.5}\left(\cfrac{\left(g + \cfrac{\Delta p'_v}{\alpha_{l,i}\rho_l L_v \cos\alpha}\right)\sigma}{\rho_l}\right)^{0.25}}$$

Slug flow (SF) occurs if GVF, calculated on the basis of equation E.1, >cos α·k, where 40%<k<60% and k is determined empirically, in that case:

$$S_i = \cfrac{\cfrac{V_{sl,i}}{\alpha_{l,i}}}{\cfrac{V_{sl,i}}{\alpha_{l,i}} + 0.35\sqrt{gD}}, \quad (E.4)$$

$$S_t = \cfrac{\cfrac{1}{\beta^2}\cfrac{V_{sl,i}}{\alpha_{l,i}}}{\cfrac{1}{\beta^2}\cfrac{V_{sl,i}}{\alpha_{l,i}} + 0.35\sqrt{\left(g + \cfrac{\Delta p'_v}{\alpha_{l,i}\rho_l L_v \cos\alpha}\right)D\beta}}$$

Figure 3:
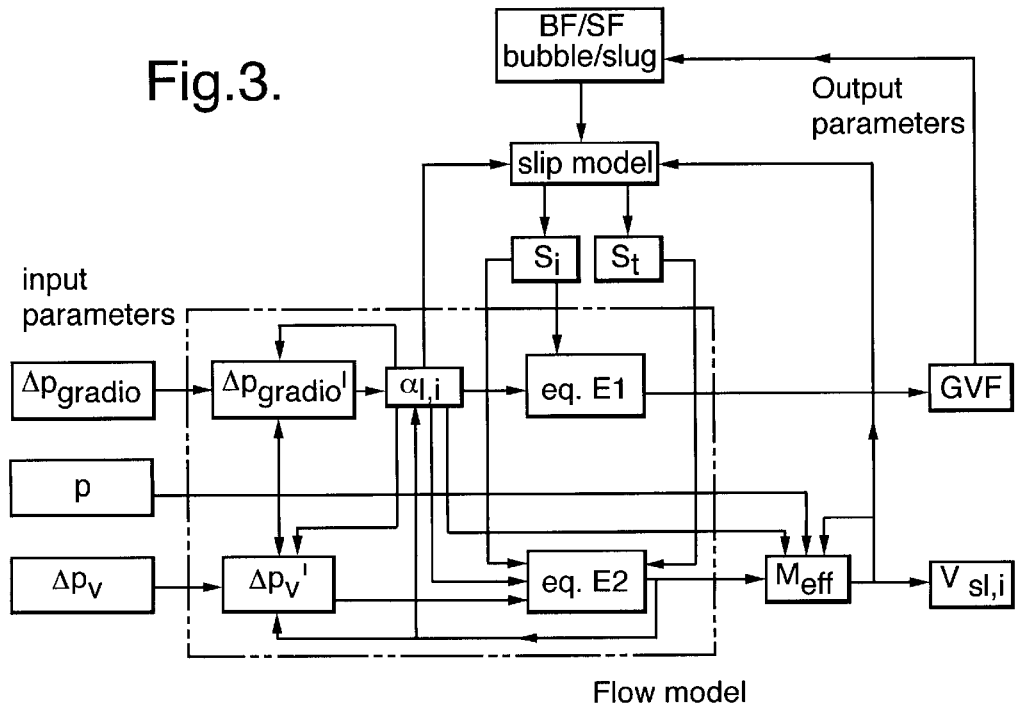
FIG. 3 shows a more detailed overview of the method according to the invention and the interaction between the flow model, the slip model and the flow pattern selection mechanism.

A detailed flow chart of the flow model is given in FIG. 3. This flow chart shows the different effects that have been accounted for, such as the occurrence of different flow patterns (bubble/slug), slip, friction and compressibility. Further the flow chart shows that iteration processes are needed for calculation of the output parameters $V_{sl,i}$ and GVF. These iterations will be discussed below.

For calculation of GVF and $V_{sl,i}$ the slip factors $S_i$ and $S_t$ are needed. For calculation of the slip in turn GVF and $V_{sl,i}$ are needed. An iteration process is therefore needed which is started by assuming in E.1 no slip (e.g. $S_i=S_t=1$), so that GVF=$1-\alpha_{l,i}$.

Another iteration process is needed in order to account for the influence of compressibility of the gas/liquid mixture; $V_{sl,i}$ is needed for $M_{eff}$ while $M_{eff}$ in its turn is needed for $V_{sl,i}$. This iteration is started by first assuming an incompressible gas/liquid mixture.

For the calculation of $V_{sl,i}$ and GVF the pressure drops $\Delta p_{gradio}$ and $\Delta p_v$ have to be corrected for the friction in the gradiometer and the venturi. However for calculation of the friction $V_{sl,i}$ is needed. In other words iteration is needed which is started by assuming no friction both in the gradiometer and in the venturi.

Besides the correction for the friction the pressure drops $\Delta p_{gradio}$ and $\Delta p_v$ have also to be corrected for the hydrostatic columns due to the gas phase and due to that of the mixture respectively. Iteration is needed because for determination of these hydrostatic columns the pressure drops $\Delta p_{gradio}$ and $\Delta p_v$ in turn are needed. This iteration is started by neglecting the hydrostatic columns.

In the determination of the slip factor in the throat of the venturi the holdups at the inlet of the venturi are used and not those in the throat of the venturi, as should be expected. This is because $S_t$ is needed for calculation of the holdups in the throat. In other words the used calculation of $S_t$ shows one step of iteration besides that already mentioned above.

Water/air and oil/air experiments were carried out at a 15 m long inclinable test loop. In these measurements the accuracies of the foregoing gas/liquid flow meter algorithms were verified. The superficial liquid velocity $V_{sl}$ and the gas volume fraction GVF', measured by this flow meter, will be considered relative to the reference liquid superficial velocity $V_{sl\_ref}$ and the reference gas volume fraction GVF_ref. Reference gas and liquid flow rate measurements were performed by single phase turbine and vortex flow meters upstream of the point where the gas and liquid flows were mixed into a multiphase flow.

Figure 4:
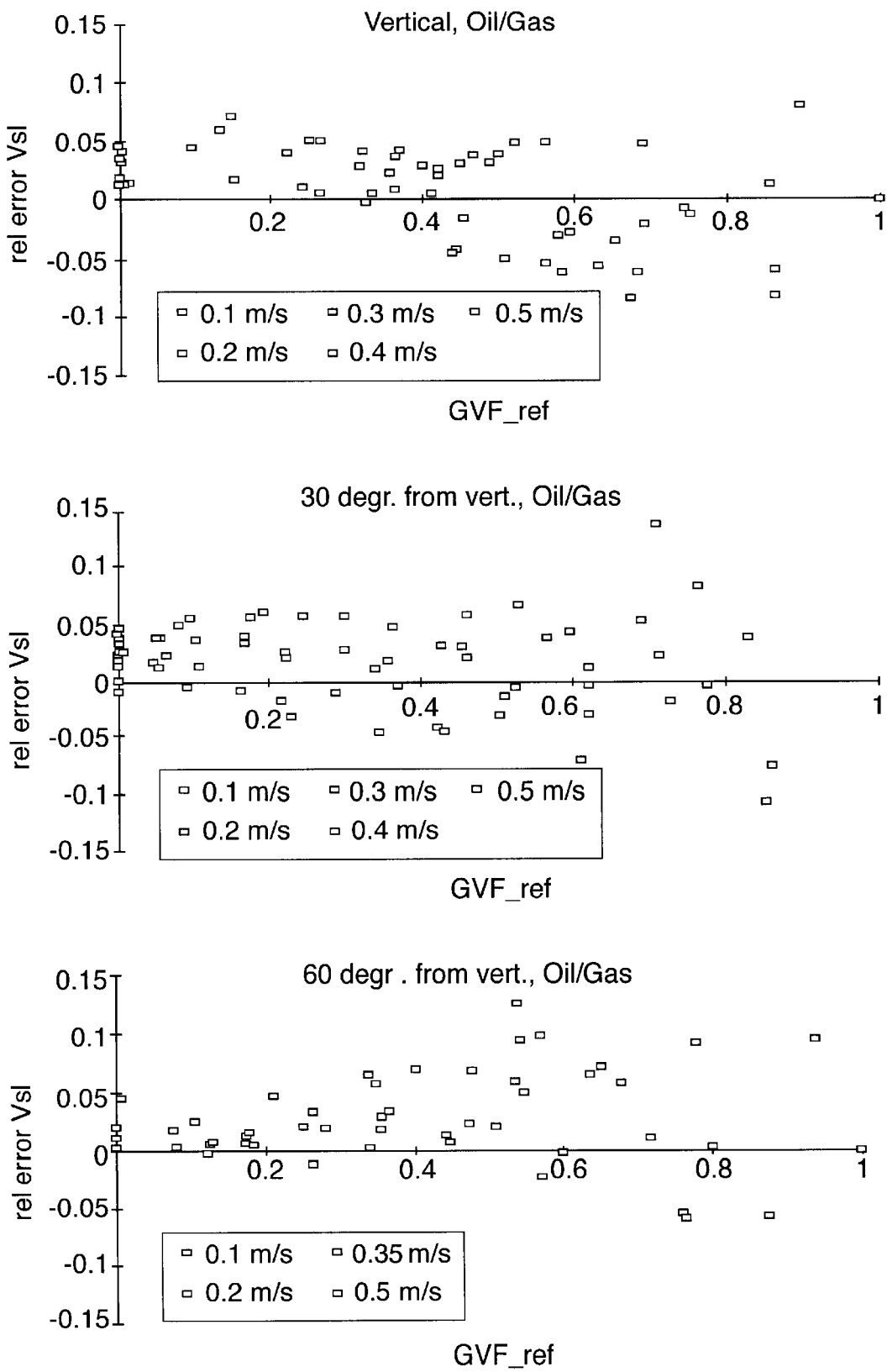
FIG. 4 shows the results of experiments in a test loop to determine the relative liquid error as a function of the reference gas volume fraction GVF-ref for three inclinations of the test loop and five different liquid rates ranging from 0.1 up to 0.5 m/s.

FIGS. 4 and 5 give the error in the superficial liquid velocity $V_{sl}$ relative to $V_{sl\_ref}$, or relative liquid error, as a function of the reference gas volume fraction GVF_ref. The relative liquid error is defined as:

$$\text{rel error } V_{sl} = \frac{V_{sl} - V_{sl\_ref}}{V_{sl\_ref}} \quad (3.1)$$

FIG. 4 gives these errors for five reference superficial liquid velocities, ranging from 0.1 up to 0.5 m/s, and for three different inclinations. In these measurements a venturi with β=0.3 has been used in order to obtain reasonable pressure drops from small liquid rates. β is defined as the ratio of the diameter in the throat of the venturi and that of the straight pipe. FIG. 5 gives the relative liquid errors for two reference liquid rates, 1 and 2 m/s, and for three different inclinations. For these measurements a venturi with β=0.5 has been used.

FIGS. 4 and 5 show that the absolute value of the relative liquid error remains lower than 10% for gas volume fractions up to 70% except for a small region of GVF_ref, between 10% and 20% gas volume fraction, at a liquid rate of 2 m/s. In this small region the relative liquid error slightly exceeds the 10% limit, which may be caused by cavitation effects. At downhole conditions this cavitation effect will have a much smaller impact on the relative liquid error. Therefore overall it can be concluded that the variable slip model is fit for determining the relative liquid error within 10% up to 70% gas volume fraction.

FIG. 6 shows the measured gas volume fraction GVF' as a function of the reference value GVF_ref for three different inclinations and for reference liquid rates ranging from 0.1 m/s to 2 m/s. For comparison the reference line (GVF_ref vs. GVF_ref) has been drawn. It appears that the absolute error remains within 10% for almost all cases up to 70% gas volume fraction. Further it must be noted that the absolute error increases as GVF increases.

We claim:

1. A method for measuring fluid flow characteristics in a multiphase fluid stream which passes through a gradiometer-venturi flow meter, the method comprising:

measuring liquid holdup ($\alpha_{l,l}$) at or near the inlet of the venturi;

determining a slipfactor (S) which expresses the difference between the gas and liquid velocity at a selected location in the venturi, which slip factor is based on the measured level of liquid holdup; and calculating the fluid flow characteristics on the basis of an algorithm which takes into account the measured liquid holdup and slipfactor (S), characterized in that said algorithm takes into account the measured liquid holdup ($\alpha_{l,l}$) at the inlet of the venturi and different slip factors at the inlet ($S_i$) and in the throat of the venturi ($S_t$).

2. The method of claim 1, wherein if the liquid holdup at the inlet of the venturi $\alpha_{l,l}$ exceeds a predetermined value slipfactors at the inlet of the venturi ($S_i$) and in the throat of the venturi ($S_t$) are determined from empirical correlations, which slipfactors are used as input in a first algorithm, together with the pressure drop between the inlet and throat of the venturi, to calculate the superficial liquid velocity, whereas if the liquid holdup at the inlet of the venturi remains below the predetermined value then the slip factors $S_i$ and $S_t$ are determined using empirical correlations given in a second algorithm.

3. The method of claim 2, wherein if the liquid holdup at the inlet of the venturi $\alpha_{1,I}$ exceeds a predetermined value, it is assumed that bubble flow (BF) occurs and slipfactors at the inlet of the venturi ($S_i$) and at the throat of the venture ($S_t$) are determined from the empirical correlations $$S_i = \frac{\frac{V_{sl,i}}{\alpha_{l,i}}}{\frac{V_{sl,i}}{\alpha_{1,i}} + 1.53\left(\alpha_{l,i}^{0.5}\left(\frac{g\sigma}{\rho_1}\right)\right)^{0.25}},$$

$$S_t = \frac{\frac{1}{\beta^2}\frac{V_{sl,i}}{\alpha_{l,i}}}{\frac{1}{\beta^2}\frac{V_{sl,i}}{\alpha_{l,i}} + 1.53\left(\alpha_{l,i}^{0.5}\left(\frac{\left(g + \frac{\Delta p'_v}{\alpha_{l,i}\rho_1 L_v \cos\alpha}\right)\sigma}{\rho_1}\right)\right)^{0.25}}$$

and used as input in the algorithm $$V_{sl,i} = \frac{S_i}{\frac{1}{\alpha_{l,i}} + (S_i - 1)}\sqrt{\frac{(1 - M_{\text{eff}}^2)2\Delta p'_v}{\left(\frac{A_i^2}{A_t^2}\right)\frac{S_i\rho_1 + \frac{\alpha_{g,i}}{\alpha_{l,i}}S_t\rho_g}{S_i + \frac{\alpha_{g,i}}{\alpha_{l,i}}S_t} - \alpha_{l,i}\rho_1 - \alpha_{g,i}\rho_g}},$$

wherein $$\Delta p'_v = \Delta p_v - \alpha_{l,i}\rho_1 g L_v \cos\alpha - 0.5\left[\frac{1 - \beta^4}{4(1 - \beta)\beta^4}\right]\alpha_{l,i}f_{tp}\rho_1 V_{m,i}^2\frac{L_v}{D}$$

$$\alpha_{l,i} = \frac{\Delta p_{gradio} - \rho_g g L_{gradio}\cos\alpha}{(\rho_1 - \rho_g)g L_{gradio}\cos\alpha + 0.5 f_{tp}\rho_1 V_{m,i}^2\frac{L_{gradio}}{D}}$$

$$M_{\text{eff}} = \sqrt{\frac{\alpha_{l,i}(1 - \alpha_{l,i})\rho_1}{p}} \cdot \frac{V_{m,i}}{\beta_{\text{eff}}^2},$$

together with the pressure drop between the inlet and the throat of the venturi, to calculate the superficial liquid velocity $V_{sl}$, whereas if the liquid holdup at the venturi remains below the predetermined value it is assumed that slug flow (SF) occurs and the slipfactors $S_i$ and $S_t$ are determined from the empirical correlations $$S_i = \frac{\frac{V_{sl,i}}{\alpha_{l,i}}}{\frac{V_{sl,i}}{\alpha_{l,i}} + 0.35\sqrt{gD}},$$

$$S_t = \frac{\frac{1}{\beta^2}\frac{V_{sl,i}}{\alpha_{l,i}}}{\frac{1}{\beta^2}\frac{V_{sl,i}}{\alpha_{l,i}} + 0.35\sqrt{\left(g + \frac{\Delta p'_v}{\alpha_{l,i}\rho_1 L_v \cos\alpha}\right)D\beta}}; \text{ and}$$

wherein $\beta$ is the ratio of the diameters in the throat and at the inlet of the venturi, g is the gravitational acceleration, $\sigma$ is the interfacial tension, $\rho$ is the density of the liquid ($\rho_l$) and gas ($\rho_g$) respectively, $\Delta p_v$ is the pressure drop, $\Delta p_{gradio}$ is the pressure difference, $\alpha$ is the angle of inclination from vertical, Lv is the length from the inlet to the throat of the venturi, $L_{gradio}$ is the length of gradiometer, D is the diameter of the pipe, A is the cross-sectional area of the tubing at the inlet ($A_i$) and throat ($A_t$) respectively, $f_{tp}$ is a two-phase friction factor, and $V_m$ is the mixture velocity, wherein the subscript i refers to inlet conditions.

* * * * *

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 4,
Line 51, please replace the equations labeled (A.1) with the following:

$$V_{sl} = \frac{Q_l}{A}, \quad V_{sg} = \frac{Q_g}{A}$$

Line 63, please replace the equation labeled (A.2) with the following:

$$GVF = 1 - LVF = \frac{V_{sg}}{V_{sg} + V_{sl}}$$

Column 5,
Line 4, please replace the equations labeled (A.3) with the following:

$$V_{al} = \frac{V_{sl}}{\alpha_l}, \quad V_{ag} = \frac{V_{sg}}{\alpha_g}$$

Line 17, please replace the equation labeled (A.4) with the following:

$$S = \frac{V_{al}}{V_{ag}}$$

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 5 cont'd,
Line 40, please replace the equation labeled (B.1) with the following:

$$GVF = 1 - LVF = \frac{\alpha_{g,i}}{1 + \alpha_{l,i}(S_i - 1)}$$

Lines 50-54, please replace the equation labeled (B.2) with the following:

$$\alpha_{l,i} = 1 - \alpha_{g,i} = \frac{\Delta p_{gradio} - \alpha_{g,i}\rho_g g L_{gradio} \cos\alpha - 0.5\alpha_{l,i} f_{tp} \rho_l V_{m,i}^2 \frac{L_{gradio}}{D}}{\rho_l g L_{gradio} \cos\alpha}$$

Column 6,
Line 3, please replace the equation labeled (B.3) with the following:

$$\alpha_{l,i} = \frac{\Delta p_{gradio} - \rho_g g L_{gradio} \cos\alpha}{(\rho_l - \rho_g) g L_{gradio} \cos\alpha + 0.5 f_{tp} \rho_l V_{m,i}^2 \frac{L_{gradio}}{D}}$$

Line 18, please replace the equation labeled (B.4) with the following:

$$f_{tp} = \left(0.0072 + 0.636\left(\frac{\mu_l}{\rho_l V_{m,i} D}\right)^{0.355}\right)(1 + GVF)^2$$

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 6 cont'd,
Line 39, please replace the equation labeled (B.5) with the following:

$$\Delta p'_v = \Delta p_v - \alpha_{l,i} \rho_l g L_v \cos\alpha - 0.5 \alpha_{l,i} f_{tp} \rho_l V_{m,i}^2 \frac{L_v}{D}\left[\frac{1-\beta^4}{4\beta^4(1-\beta)}\right] = \Delta\left(\frac{1}{2}\rho_m V_m^2\right)\Big|_{\text{inlet}}^{\text{throat}}$$

Column 7,
Line 10, please replace the equation labeled (B.7) with the following:

$$V_{m,i} = \sqrt{\frac{2\Delta p'_v}{\frac{A_i^2}{A_t^2}(\alpha_{l,i}\rho_l + \alpha_{g,i}\rho_g) - (\alpha_{l,i}\rho_l + \alpha_{g,i}\rho_g)}}$$

Line 20, please replace the equation labeled (B.8) with the following:

$$V_{sl,i} = \frac{\alpha_{l,i} S_i}{1 + \alpha_{l,i}(S_i - 1)} \sqrt{\frac{2\Delta p'_v}{\frac{A_i^2}{A_t^2}(\alpha_{l,i}\rho_l + \alpha_{g,i}\rho_g) - (\alpha_{l,i}\rho_l + \alpha_{g,i}\rho_g)}}$$

Line 39, please replace the equation labeled (B.10) with the following:

$$\alpha_{l,t} = 1 - \alpha_{g,t} = \frac{\alpha_{l,i} S_i}{\alpha_{l,i} S_i + \alpha_{g,i} S_t}$$

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 7 cont'd,
Lines 45-55, please replace the equations labeled (B.11) with the following set of equations:

$$V_{sl,i} = \frac{S_i}{\frac{1}{\alpha_{l,i}}+(S_i-1)} \sqrt{\frac{2\Delta p_v'}{\left(\frac{A_i^2}{A_t^2}\right)\frac{S_i\rho_l + \frac{\alpha_{g,i}}{\alpha_{l,i}}S_i\rho_g}{S_i + \frac{\alpha_{g,i}}{\alpha_{l,i}}S_t} - \alpha_{l,i}\rho_l - \alpha_{g,i}\rho_g}}$$

$$\text{with } \alpha_{l,i} = \frac{\Delta p_{gradio} - \rho_g g L_{gradio} \cos\alpha}{(\rho_l - \rho_g)gL_{gradio}\cos\alpha + 0.5 f_{tp}\rho_l V_{m,i}^2 \frac{L_{gradio}}{D}}$$

Column 8,
Line 10, please replace the equation labeled (C.1) with the following:

$$V_\infty = C\left[\frac{g\sigma\Delta\rho}{\rho_l^2}\right]^{1/4}$$

Line 29, please replace the equation labeled (C.2) with the following:

$$V_{slip} = \alpha_w^n V_\infty$$

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 8 cont'd,
Line 39, please replace the equation labeled (C.3) with the following:

$$S_{NW} = \frac{V_{al}}{V_{ag}} = \frac{V_{al}}{V_{al} + \alpha_l^n V_\infty}$$

Line 59, please replace the equation labeled (C.4) with the following:

$$S_{EB} = \frac{V_{al}}{V_{ag}} = \frac{V_{al}}{V_{al} + C\sqrt{gD}}$$

Column 9,
Line 11, please replace the equation labeled (C.5) with the following:

$$g' = \frac{\Delta p_v'}{\alpha_{l,i} \rho_l h_v} + g$$

Line 29, please replace the equation labeled (D.1) with the following:

$$c_T^2 = \frac{p}{\rho_l \alpha_g \alpha_l}$$

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 9 cont'd,
Line 46, please replace the equation labeled (D.2) with the following:

$$M = \frac{V_m}{c}$$

Line 54, please replace the equation label with the label "(D.3)" and replace the equation with the following:

$$\frac{dp}{dx} = \rho_l V_m^2 \frac{1}{(1-M^2)} \frac{1}{A} \frac{dA}{dx} \qquad (D.3)$$

Line 62, please replace the equation label with the label "(D.4)" and replace the equation with the following:

$$\Delta p_\nu \cdot (1-M^2) = \left(\frac{1}{2} \rho_m V_m^2\right)\Big|_{inlet}^{throat} \qquad (D.4)$$

Column 10,
Line 19, please replace the equation label with the label "(D.5)" and replace the equation with the following:

$$M_{\mathit{eff}} = \frac{V_{m,i}}{c_i} \cdot \frac{1}{\beta_{\mathit{eff}}^2} \qquad (D.5)$$

UNITED STATES PATENT AND TRADEMARK OFFICE
CERTIFICATE OF CORRECTION

PATENT NO.    : 6,378,380 B1
DATED         : April 30, 2002
INVENTOR(S)   : Roel Marie Kusters and Antony Aloysius Hubertus Vandeweijer It is certified that error appears in the above-identified patent and that said Letters Patent is hereby corrected as shown below:

Column 10 cont'd,
Lines 36-44, please replace the equation labels and the equations with the following:

$$GVF = \frac{(1-\alpha_{li})}{1+\alpha_{li}(S_i-1)} \qquad (E.1)$$

$$V_{sl,i} = \frac{S_i}{\frac{1}{\alpha_{l,i}}+(S_i-1)} \sqrt{\frac{(1-M_{\mathit{eff}}^2)2\Delta p_v'}{\left(\frac{A_i^2}{A_t^2}\right)\frac{S_i\rho_l + \frac{\alpha_{g,i}}{\alpha_{l,i}}S_i\rho_g}{S_i+\frac{\alpha_{g,i}}{\alpha_{l,i}}S_t} - \alpha_{l,i}\rho_l - \alpha_{g,i}\rho_g}} \qquad (E.2)$$

Lines 47-57, please replace the equations shown with the following:

$$\Delta p_v' = \Delta p_v - \alpha_{l,i}\rho_l g L_v \cos\alpha - 0.5\left[\frac{1-\beta^4}{4(1-\beta)\beta^4}\right]\alpha_{l,i}f_{tp}\rho_l V_{m,i}^2 \frac{L_v}{D}$$

$$\alpha_{l,i} = \frac{\Delta p_{gradio} - \rho_g g L_{gradio}\cos\alpha}{(\rho_l-\rho_g)gL_{gradio}\cos\alpha + 0.5 f_{tp}\rho_l V_{m,i}^2 \frac{L_{gradio}}{D}}$$

$$M_{\mathit{eff}} = \sqrt{\frac{\alpha_{l,i}(1-\alpha_{l,i})\rho_l}{p}} \cdot \frac{V_{m,i}}{\beta_{\mathit{eff}}^2}$$

UNITED STATES PATENT AND TRADEMARK OFFICE
CERTIFICATE OF CORRECTION

PATENT NO. : 6,378,380 B1
DATED : April 30, 2002
INVENTOR(S) : Roel Marie Kusters and Antony Aloysius Hubertus Vandeweijer It is certified that error appears in the above-identified patent and that said Letters Patent is hereby corrected as shown below:

Column 10, Lines 62 through Column 11, line 9, please replace the equation label with the label "(E.3)" and replace the equations shown with the following:

$$S_i = \frac{\dfrac{V_{sl,i}}{\alpha_{l,i}}}{\dfrac{V_{sl,i}}{\alpha_{l,i}} + 1.53\alpha_{l,i}^{0.5}\left(\dfrac{g\sigma}{\rho_l}\right)^{0.25}} \;,\; S_t = \frac{\dfrac{1}{\beta^2}\dfrac{V_{sl,i}}{\alpha_{l,i}}}{\dfrac{1}{\beta^2}\dfrac{V_{sl,i}}{\alpha_{l,i}} + 1.53\alpha_{l,i}^{0.5}\left(\dfrac{\left(g + \dfrac{\Delta p_v'}{\alpha_{l,i}\rho_l L_v \cos\alpha}\right)\sigma}{\rho_l}\right)^{0.25}} \quad (E.3)$$

Column 11,
Lines 13-23, please replace the equation label with the label "(E.4)" and replace the equations shown with the following:

$$S_i = \frac{\dfrac{V_{sl,i}}{\alpha_{l,i}}}{\dfrac{V_{sl,i}}{\alpha_{l,i}} + 0.35\sqrt{gD}} \;,\; S_t = \frac{\dfrac{1}{\beta^2}\dfrac{V_{sl,i}}{\alpha_{l,i}}}{\dfrac{1}{\beta^2}\dfrac{V_{sl,i}}{\alpha_{l,i}} + 0.35\sqrt{\left(g + \dfrac{\Delta p_v'}{\alpha_{l,i}\rho_l L_v \cos\alpha}\right)D\beta}} \quad (E.4)$$

Column 12,
Line 10, please replace the equation label with the label "(3.1)" and replace the equation with the following:

$$\text{rel error } V_{sl} = \frac{V_{sl} - V_{sl\_ref}}{V_{sl\_ref}} \quad (3.1)$$

UNITED STATES PATENT AND TRADEMARK OFFICE
CERTIFICATE OF CORRECTION

PATENT NO.    : 6,378,380 B1
DATED         : April 30, 2002
INVENTOR(S)   : Roel Marie Kusters and Antony Aloysius Hubertus Vandeweijer It is certified that error appears in the above-identified patent and that said Letters Patent is hereby corrected as shown below:

Column 13,
Lines 8-20, please replace the equations shown with the following:

$$S_i = \frac{\dfrac{V_{sl,i}}{\alpha_{l,i}}}{\dfrac{V_{sl,i}}{\alpha_{l,i}} + 1.53\alpha_{l,i}^{0.5}\left(\dfrac{g\sigma}{\rho_l}\right)^{0.25}} \;,\; S_i = \frac{\dfrac{1}{\beta^2}\dfrac{V_{sl,i}}{\alpha_{l,i}}}{\dfrac{1}{\beta^2}\dfrac{V_{sl,i}}{\alpha_{l,i}} + 1.53\alpha_{l,i}^{0.5}\left(\dfrac{\left(g + \dfrac{\Delta p_v'}{\alpha_{l,i}\rho_l L_v \cos\alpha}\right)\sigma}{\rho_l}\right)^{0.25}}$$

Line 24, please replace the equation shown with the following:

$$V_{sl,i} = \frac{S_i}{\dfrac{1}{\alpha_{l,i}} + (S_i - 1)} \sqrt{\frac{(1 - M_{eff}^2)2\Delta p_v'}{\left(\dfrac{A_i^2}{A_t^2}\right)\dfrac{S_i\rho_l + \dfrac{\alpha_{g,i}}{\alpha_{l,i}}S_i\rho_g}{S_i + \dfrac{\alpha_{g,i}}{\alpha_{l,i}}S_i} - \alpha_{l,i}\rho_l - \alpha_{g,i}\rho_g}}$$

Lines 31-39, please replace the equations shown with the following:

$$\Delta p_v' = \Delta p_v - \alpha_{l,i}\rho_l g L_v \cos\alpha - 0.5\left[\frac{1-\beta^4}{4(1-\beta)\beta^4}\right]\alpha_{l,i}f_{tp}\rho_l V_{m,i}^2 \frac{L_v}{D}$$

$$\alpha_{l,i} = \frac{\Delta p_{gradio} - \rho_g g L_{gradio} \cos\alpha}{(\rho_l - \rho_g)g L_{gradio} \cos\alpha + 0.5 f_{tp}\rho_l V_{m,i}^2 \dfrac{L_{gradio}}{D}}$$

$$M_{eff} = \sqrt{\frac{\alpha_{l,i}(1-\alpha_{l,i})\rho_l}{p}} \cdot \frac{V_{m,i}}{\beta_{eff}^2}$$

UNITED STATES PATENT AND TRADEMARK OFFICE
CERTIFICATE OF CORRECTION

PATENT NO.   : 6,378,380 B1
DATED        : April 30, 2002
INVENTOR(S)  : Roel Marie Kusters and Antony Aloysius Hubertus Vandeweijer It is certified that error appears in the above-identified patent and that said Letters Patent is hereby corrected as shown below:

Column 14,
Lines 6-15, please replace the equations shown with the following:

$$S_i = \frac{\dfrac{V_{sl,i}}{\alpha_{l,i}}}{\dfrac{V_{sl,i}}{\alpha_{l,i}} + 0.35\sqrt{gD}} \;,\; S_i = \frac{\dfrac{1}{\beta^2}\dfrac{V_{sl,i}}{\alpha_{l,i}}}{\dfrac{1}{\beta^2}\dfrac{V_{sl,i}}{\alpha_{l,i}} + 0.35\sqrt{\left(g + \dfrac{\Delta p'_v}{\alpha_{l,i}\rho_l L_v \cos\alpha}\right)D\beta}}$$

Signed and Sealed this

Twenty-seventh Day of May, 2003

JAMES E. ROGAN
*Director of the United States Patent and Trademark Office*